United States Patent
Sample

(10) Patent No.: US 8,397,296 B2
(45) Date of Patent: Mar. 12, 2013

(54) SERVER RESOURCE MANAGEMENT, ANALYSIS, AND INTRUSION NEGATION

(75) Inventor: Char Sample, Ellicott City, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 479 days.

(21) Appl. No.: 12/027,210

(22) Filed: Feb. 6, 2008

(65) Prior Publication Data

US 2008/0133749 A1 Jun. 5, 2008

Related U.S. Application Data

(63) Continuation of application No. 10/290,961, filed on Nov. 8, 2002, now Pat. No. 7,353,538.

(51) Int. Cl.
*G06F 11/30* (2006.01)
*G08B 23/00* (2006.01)
*G06F 12/14* (2006.01)

(52) U.S. Cl. ............... 726/23; 726/24; 726/25; 726/1; 713/164; 713/165; 713/166; 713/167; 718/105; 709/226

(58) Field of Classification Search .............. 726/23, 726/24, 25, 1; 718/105; 709/226; 716/164; 713/165, 166, 167
See application file for complete search history.

(56) References Cited

U.S. PATENT DOCUMENTS

| | | | | |
|---|---|---|---|---|
| 5,696,701 A | * | 12/1997 | Burgess et al. | ............. 714/25 |
| 5,774,668 A | | 6/1998 | Choquier et al. | |
| 5,852,717 A | | 12/1998 | Bhide et al. | |
| 5,862,333 A | * | 1/1999 | Graf | ............. 709/223 |
| 5,864,683 A | | 1/1999 | Boebert et al. | |
| 5,933,490 A | * | 8/1999 | White et al. | ............. 379/221.01 |
| 5,951,694 A | * | 9/1999 | Choquier et al. | ............. 714/15 |
| 5,991,795 A | | 11/1999 | Howard et al. | |
| 6,026,440 A | * | 2/2000 | Shrader et al. | ............. 709/224 |
| 6,106,575 A | | 8/2000 | Hardwick | |
| 6,122,664 A | | 9/2000 | Boukobza et al. | |
| 6,202,070 B1 | | 3/2001 | Nguyen et al. | |
| 6,219,719 B1 | | 4/2001 | Graf | |
| 6,222,856 B1 | * | 4/2001 | Krishnan et al. | ............. 370/468 |
| 6,356,863 B1 | | 3/2002 | Sayle | |
| 6,389,129 B1 | | 5/2002 | Cowan | |
| 6,438,652 B1 | * | 8/2002 | Jordan et al. | ............. 711/120 |
| 6,466,980 B1 | | 10/2002 | Lumelsky et al. | |
| 6,477,667 B1 | * | 11/2002 | Levi et al. | ............. 714/57 |
| 6,557,035 B1 | | 4/2003 | McKnight | |
| 6,564,243 B1 | | 5/2003 | Yedidia et al. | |
| 6,622,226 B1 | | 9/2003 | Dussud | |
| 6,654,745 B2 | | 11/2003 | Feldman | |

(Continued)

FOREIGN PATENT DOCUMENTS

EP 1241849 9/2002
FR 2812099 1/2002

(Continued)

OTHER PUBLICATIONS

Stephenson, Peter "Investigating Computer-Related Crime", 2000 CRC Press LLC, <http://www.infosecuritynetbase.com>, Chapter 4 and Appendix A.*

(Continued)

*Primary Examiner* — Michael Simitoski

(57) ABSTRACT

A console host and intrusion negation system (CHAINS) includes a host component and a console component. The host component monitors resources at a server. Resources that are becoming overloaded can be throttled back. Reports relating to resource usage may be transmitted to the console component. At the console component, resource reports from multiple host components may be viewed and managed.

15 Claims, 6 Drawing Sheets

U.S. PATENT DOCUMENTS

| | | | |
|---|---|---|---|
| 6,681,232 | B1 | 1/2004 | Sistanizadeh et al. |
| 6,760,747 | B2 | 7/2004 | Allard et al. |
| 6,782,398 | B1 | 8/2004 | Bahl |
| 6,801,940 | B1 | 10/2004 | Moran et al. |
| 6,804,778 | B1 | 10/2004 | Levi et al. |
| 6,832,256 | B1 | 12/2004 | Toga |
| 7,039,673 | B1 | 5/2006 | Abbott et al. |
| 7,124,403 | B2 | 10/2006 | Price et al. |
| 7,159,149 | B2 | 1/2007 | Spiegel et al. |
| 7,203,959 | B2 | 4/2007 | Nachenberg et al. |
| 7,249,179 | B1* | 7/2007 | Romero et al. ............... 709/226 |
| 7,305,562 | B1* | 12/2007 | Bianco et al. ................ 713/186 |
| 7,373,644 | B2* | 5/2008 | Aborn ........................... 718/105 |
| 7,376,080 | B1 | 5/2008 | Riddle et al. |
| 7,418,732 | B2 | 8/2008 | Campbell et al. |
| 7,562,130 | B2 | 7/2009 | Dillon et al. |
| 7,571,181 | B2 | 8/2009 | Rhodes |
| 2001/0044840 | A1 | 11/2001 | Carleton |
| 2001/0052087 | A1* | 12/2001 | Garg et al. .................... 714/37 |
| 2002/0046264 | A1 | 4/2002 | Dillon et al. |
| 2002/0054169 | A1* | 5/2002 | Richardson .................. 345/854 |
| 2002/0065911 | A1 | 5/2002 | von Klopp et al. |
| 2002/0066034 | A1 | 5/2002 | Schlossberg et al. |
| 2002/0083175 | A1 | 6/2002 | Afek et al. |
| 2002/0101819 | A1 | 8/2002 | Goldstone |
| 2002/0103916 | A1 | 8/2002 | Chen et al. |
| 2002/0108060 | A1 | 8/2002 | Takamoto et al. |
| 2002/0129088 | A1 | 9/2002 | Zhou et al. |
| 2002/0133603 | A1 | 9/2002 | Mitomo et al. |
| 2002/0138643 | A1 | 9/2002 | Shin et al. |
| 2002/0157020 | A1 | 10/2002 | Royer |
| 2002/0161868 | A1 | 10/2002 | Paul et al. |
| 2002/0161891 | A1 | 10/2002 | Higuchi et al. |
| 2002/0161913 | A1 | 10/2002 | Gonzalez et al. |
| 2002/0166046 | A1 | 11/2002 | Bidarahalli et al. |
| 2002/0178262 | A1* | 11/2002 | Bonnell et al. ................ 709/225 |
| 2002/0184363 | A1 | 12/2002 | Vianvant et al. |
| 2002/0194340 | A1 | 12/2002 | Ebstyne et al. |
| 2002/0194490 | A1 | 12/2002 | Halperin et al. |
| 2003/0023873 | A1 | 1/2003 | Ben-Itzhak |
| 2003/0028642 | A1 | 2/2003 | Agarwal et al. |
| 2003/0028803 | A1 | 2/2003 | Bunker et al. |
| 2003/0051142 | A1 | 3/2003 | Hidalgo et al. |
| 2003/0056116 | A1 | 3/2003 | Bunker et al. |
| 2003/0065986 | A1* | 4/2003 | Fraenkel et al. ............... 714/47 |
| 2003/0069974 | A1* | 4/2003 | Lu et al. ........................ 709/226 |
| 2003/0084349 | A1* | 5/2003 | Friedrichs et al. ............ 713/201 |
| 2003/0112269 | A1* | 6/2003 | Lentz et al. ................... 345/738 |
| 2003/0115244 | A1 | 6/2003 | Molloy et al. |
| 2003/0154284 | A1 | 8/2003 | Bernardin et al. |
| 2003/0154399 | A1 | 8/2003 | Zuk et al. |
| 2003/0158940 | A1 | 8/2003 | Leigh |
| 2004/0003290 | A1 | 1/2004 | Malcolm |
| 2004/0010585 | A1 | 1/2004 | Jones et al. |
| 2004/0034704 | A1* | 2/2004 | Connelly ...................... 709/224 |
| 2004/0044771 | A1 | 3/2004 | Allred et al. |
| 2004/0054791 | A1 | 3/2004 | Chakraborty et al. |
| 2004/0088412 | A1* | 5/2004 | John et al. ..................... 709/226 |
| 2004/0088571 | A1 | 5/2004 | Jerrim et al. |
| 2006/0031359 | A1 | 2/2006 | Clegg et al. |

FOREIGN PATENT DOCUMENTS

| | | |
|---|---|---|
| GB | 2363951 | 1/2002 |
| RU | 2189072 | 9/2002 |

OTHER PUBLICATIONS

Carleton University, "Managing your Unix Disk Quota", http://mathstat.carleton.ca/~help/quota.html, Aug. 22, 2002.

Estan, Cristian et al., "New Directions in Traffic Measurement and Accounting", 2001 ACM IMW'02, pp. 75-80.

Giuffrida, Mark et al., "Novell Netware Evaluation", http://www.ifs.umich.edu/~ifs/RD/NetWare/netware-eval.html, Mar. 1994.

Kargl, Frank et al., "Protecting Web Servers From Distributed Denial of Service Attacks", Mar. 2001 WWW10, pp. 514-524.

Packeteer, "PacketShaper 4000 Getting Started Version 4.0", Mar. 1999.

Stephenson, Peter, "Investigation Computer Crime", 2000 CRC Press LLC, http://www.infosecuritynetbase.com, Appendix A and Chapter 4.

Person, Ron et al., "Chapter 22, Working with Disks and Disk Drives", 1997, http://safariexamples.infomit.com/0789713993/books/win95/ch22.htm.

Cook, Dave, "Understanding Windows 2000 Disk Quotas", Oct. 2001, PC Network Advisor.

TCU, "Windows 2000—Transitions", Summer 2001.

Symantec, "Norton AntiVirus Corporate Edition Implementation Guide", 2000 Symantec Corporation, pp. i-iii, 17-21, 23-26, 181-214.

Balajinath, et al., "Intrusion detection through learning behavior model" Computer Communications, Elsevier Science B.V., vol. 24, No. 12, Jul. 15, 2001, pp. 1202-1212.

* cited by examiner

SERVER RESOURCE MANAGEMENT, ANALYSIS, AND INTRUSION NEGATION

RELATED APPLICATIONS

This application is a continuation of U.S. patent application of Ser. No. 10/290,961, filed Nov. 8, 2002, the entirety of which is incorporated herein by reference.

BACKGROUND OF THE INVENTION

A. Field of the Invention

The present invention relates generally to computer networks, and more particularly, to resource management of server computers in a public network, such as the Internet.

B. Description of Related Art

Network computer servers, such as computers that transmit HTML (HyperText Markup Language) documents to client computing devices on the Internet, may interact and receive data requests from many different end-users. It is frequently important that these computer servers maintain high levels of uptime. For example, if a server for an e-commerce site fails to respond to user requests, the site may lose sales.

There are many reasons why a server, or a group of servers, may fail. For example, the server may experience software or hardware errors that cause the server to fail. Additionally, the server may experience resource-related problems, such as too many users trying to simultaneously communicate with the server. Such resource-related problems can be "natural" resource problems in which too many bona fide users are trying to access the system simultaneously or malicious problems such as denial of service (DoS) or distributed denial of service (DDoS) attacks. In a DoS or DDoS attack, a compromised system or a multitude of compromised systems flood a server with incoming messages in an attempt to overwhelm the available server resources. Legitimate users of the server may then be denied service by the server due to the overload of its resources.

Accordingly, server system availability is an important concern for network servers, such as Internet servers. Conventional hardware solutions, such as clustering and failover, offer some assurances in this area by offering more resources to the users. However, these solutions can fail when faced with automated DoS and DDoS attacks that simply keep taking resources.

Accordingly, there is a need in the art to improve resource management in the face of attacks on system resources.

SUMMARY OF THE INVENTION

Systems and methods consistent with the principles of this invention implement a console host intrusion negation system (CHAINS) that monitors selected resources on one or more computer servers and throttles back resource usage when a server resource is overburdened.

A method consistent with an aspect of the invention includes monitoring resources associated with a network server and comparing activity levels of the resources to predetermined threshold activity levels. The method further includes reducing usage of one of the resources when the activity level associated with the resource increases above the predetermined threshold activity level.

A second aspect consistent with the present invention is directed to a computer server that includes a processor, a communication interface, and a memory containing instructions. The instructions when executed by the processor, cause the processor to monitor a usage level of the processor, the communication interface, and the memory. The instructions additionally compare the usage level of the communication interface to a first threshold and throttle back a number of active network connections when the usage level of the communication interface is greater than the first threshold; compare the usage level of the memory to a second threshold and shut down inactive processes when the usage level of the memory is above the second threshold; and compare the usage level of the processor to a third threshold and shut down inactive processes when the usage level of the processor is above the third threshold.

Yet another aspect of the present invention is directed to a system that includes a number of first computing devices and a second computing device. The first computing devices include a host software component configured to monitor resources of the first computing device and throttle back resource usage when resources of the first computing devices are being used above predetermined threshold levels. The second computing device includes a console software component configured to display alerts when the resources of the first computing devices are being used above the predetermined threshold levels.

Yet another aspect consistent with the present invention is directed to a method that includes displaying information relating to resources of remote computers, receiving information defining threshold levels for the resources at the remote computers, and transmitting the information defining the threshold levels for the resources to the remote computers. The remote computers throttle hack resource usage when a resource usage level exceeds the threshold levels.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents of the claim features.

As described below, a console host and intrusion negation system (CHAINS) monitors selected resources on one or more computer servers. Chains may include one or more host software components and a console software component. The host component resides on a server computer and monitors resource usage at the server. If a particular resource is used at a level above a preset threshold, the host component may take remedial action. The remedial action may include, for example, throttling back the resource or notifying a user via the console component.

System Overview

Figure 1:
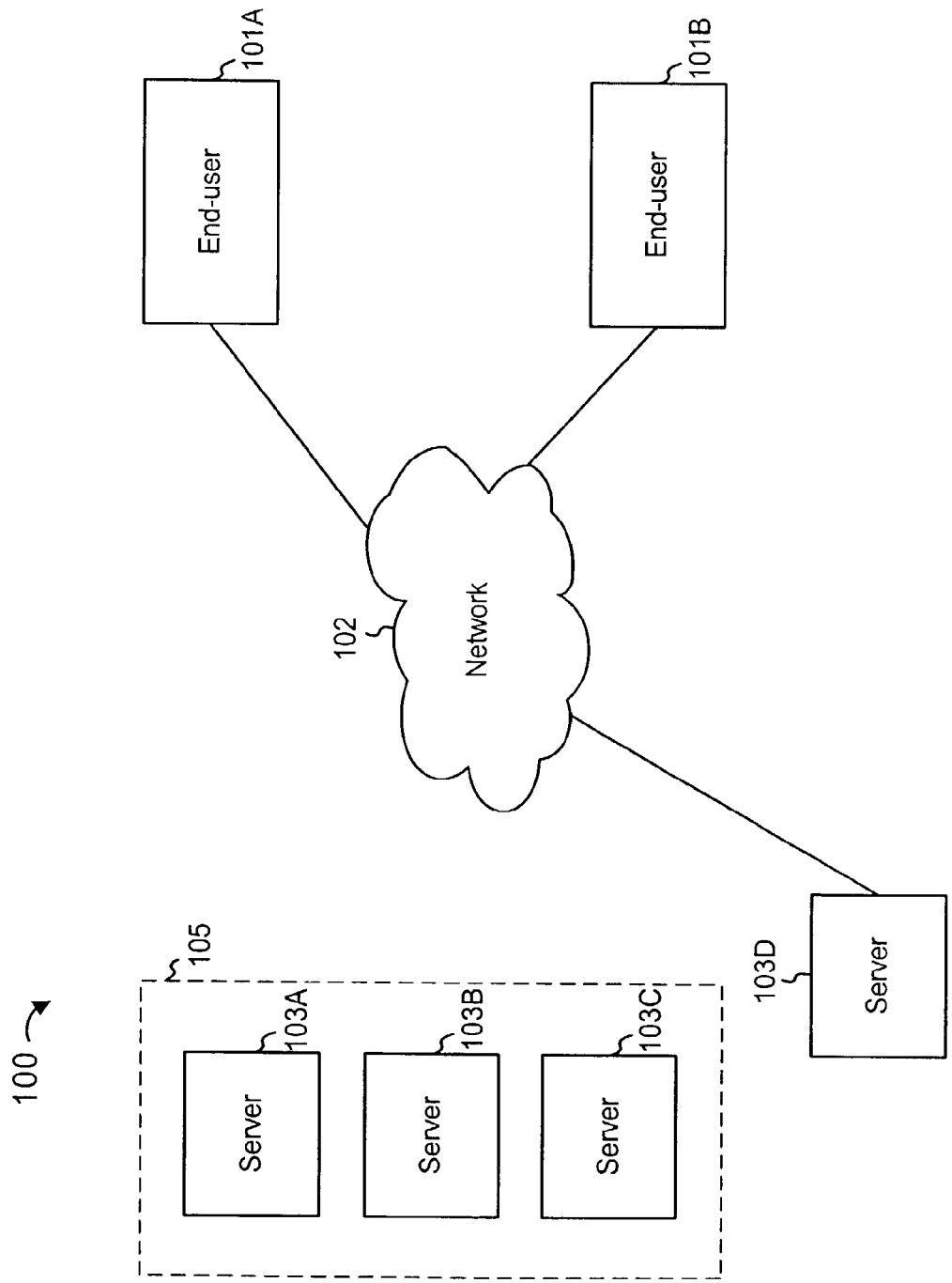
FIG. 1 is a diagram illustrating an exemplary system in which concepts consistent with the invention may be implemented.

FIG. 1 is a diagram illustrating an exemplary system 100 in which concepts consistent with the present invention may be implemented. System 100 may include a number of end-user computing devices 101A and 101B, a network 102, and server computers 103A-103D (collectively referred to as servers 103). End-user computing devices 101 may include personal computers or the like through which users connect to network 102. Network 102 may include any type of network, such as a local area network (LAN), a wide area network (WAN), a virtual private network (VPN), an intranet, the Internet, or a combination of networks. End-user computing devices 101 and servers 103 may connect to network 102 via wired, wireless, and/or optical connections.

Servers 103 may respond to requests for information from end-user computing devices 101. For example, servers 103 may be HTML servers that interact with end-user computing devices 101 through hyper-text transfer protocol (HTTP) sessions to transmit HTML web pages to users. Server 103 may include a cluster of servers, such as the three servers 103A-103C contained in cluster 105. The servers 103A-103C in cluster 105 may include a load-balancing mechanism through which the servers may jointly handle requests from end-user computing devices 101 in such a manner as to balance the distribution of work among the servers in cluster 105.

Figure 2:
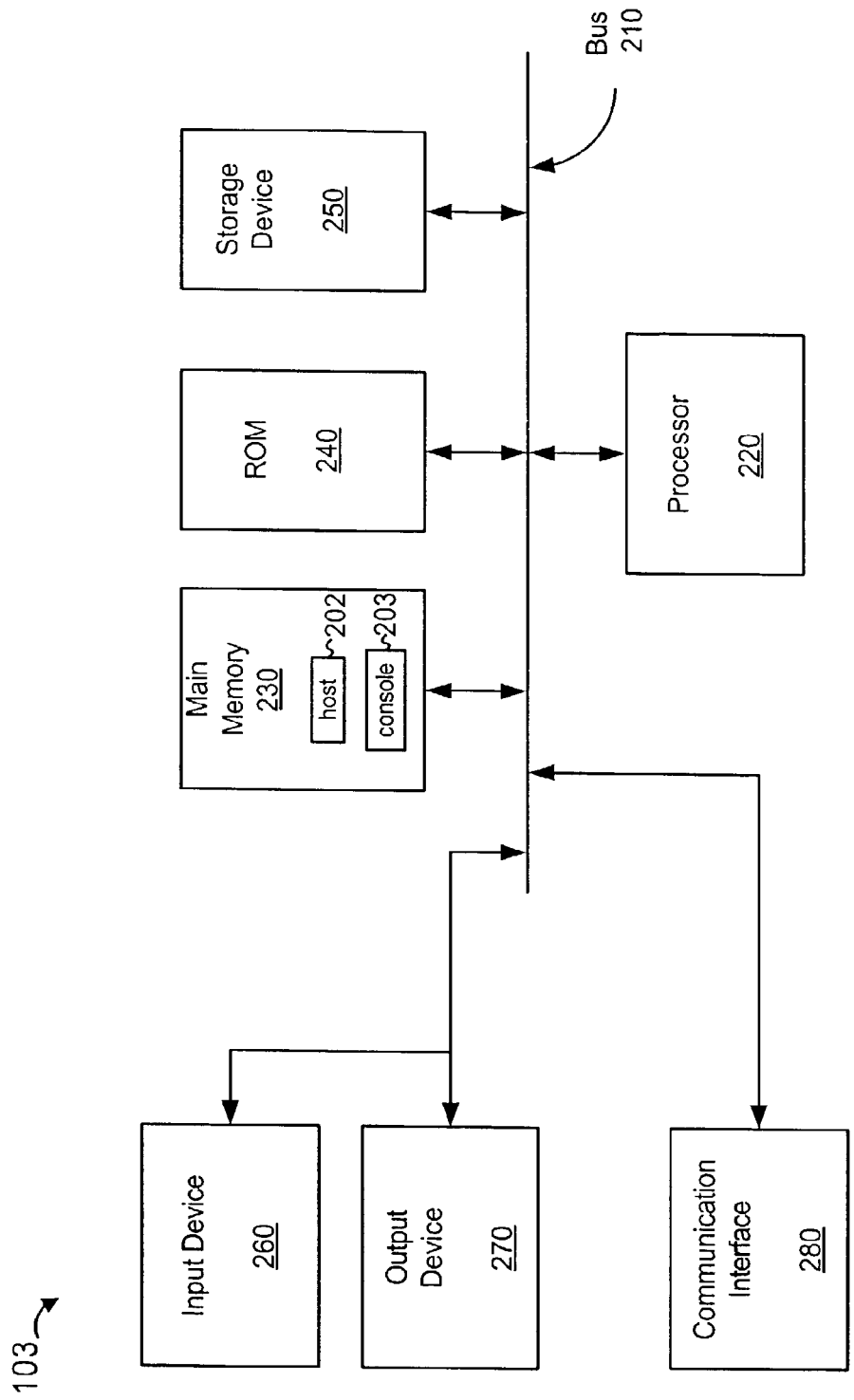
FIG. 2 is a diagram of an exemplary computing device that may correspond to one of the servers in FIG. 1.

FIG. 2 is a diagram of an exemplary computing device that may correspond to one of servers 103. Server 103 may include bus 210, processor 220, main memory 230, read only memory (ROM) 240, storage device 250, input device 260, output device 270, and communication interface 280. Bus 210 permits communication among the components of server 103.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include one or more conventional mechanisms that permit an operator to input information to computing device 103, such as a keyboard, a mouse, a pen, a number pad, a microphone and/or biometric mechanisms, etc. Output device 270 may include one or more conventional mechanisms that output information to the operator, including a display, a printer, speakers, etc. Communication interface 280 may include any transceiver-like mechanism that enables computing device 103 to communicate with other devices and/or systems. For example, communication interface 280 may include mechanisms for communicating with another device or system via a network, such as network 102.

In one implementation, main memory 230 may include computer programming instructions that implement a CHAINS host software component 202 and/or console software component 203. The operation of host component 202 and console component 203 will be described in more detail below.

Chains

Figure 3:
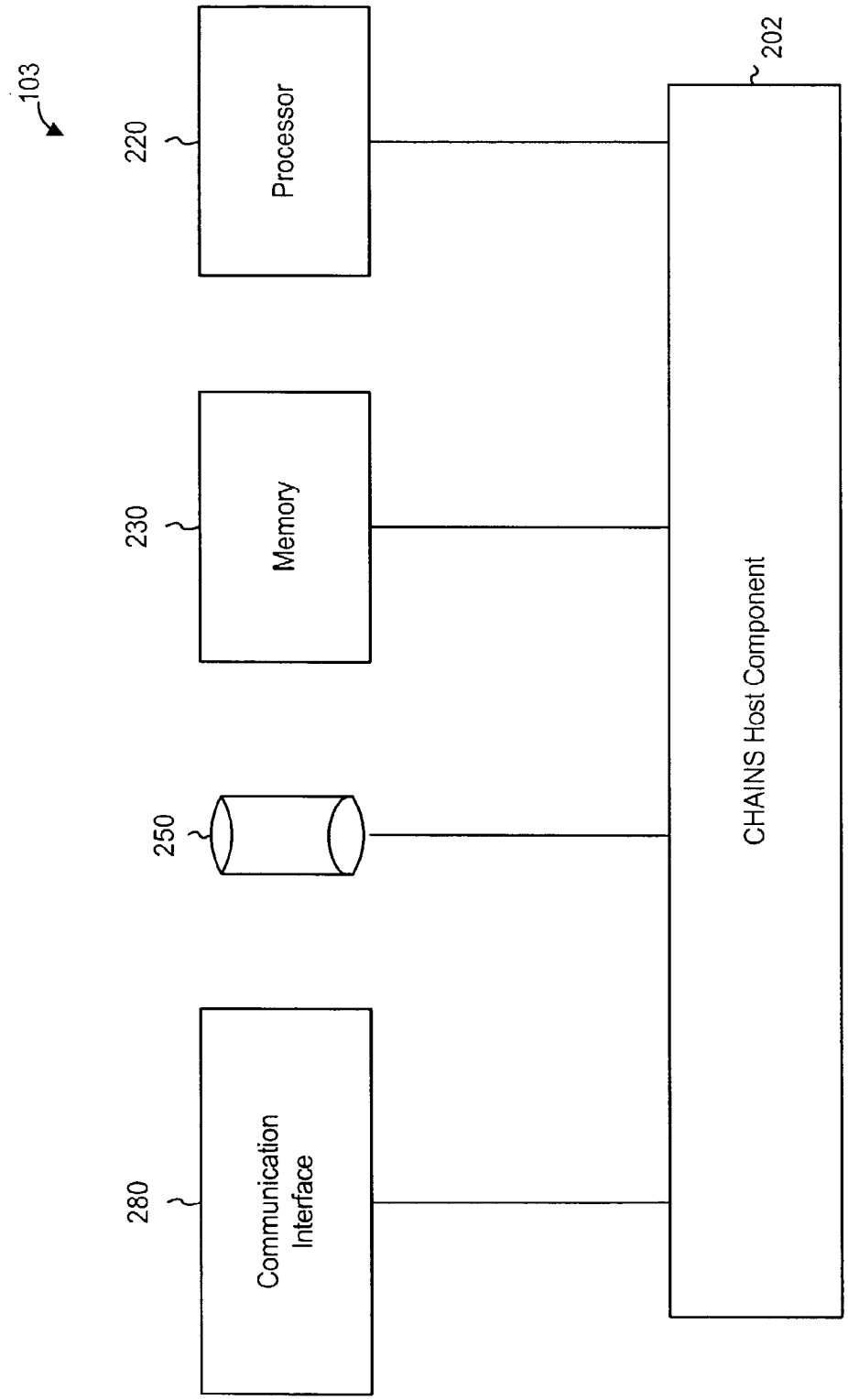
FIG. 3 is a diagram conceptually illustrating the interaction of a host component with elements of the server shown in FIG. 2.

FIG. 3 is a diagram conceptually illustrating the interaction of CHAINS host component 202 with resources associated with server 103. In particular, host component 202 may interact with communication interface 280, storage device 250, memory 230, and processor 220. In general, these elements of server 103 can be considered to be resources of server 103. Host component 202 monitors and controls the activity level of these resources.

Figure 4:
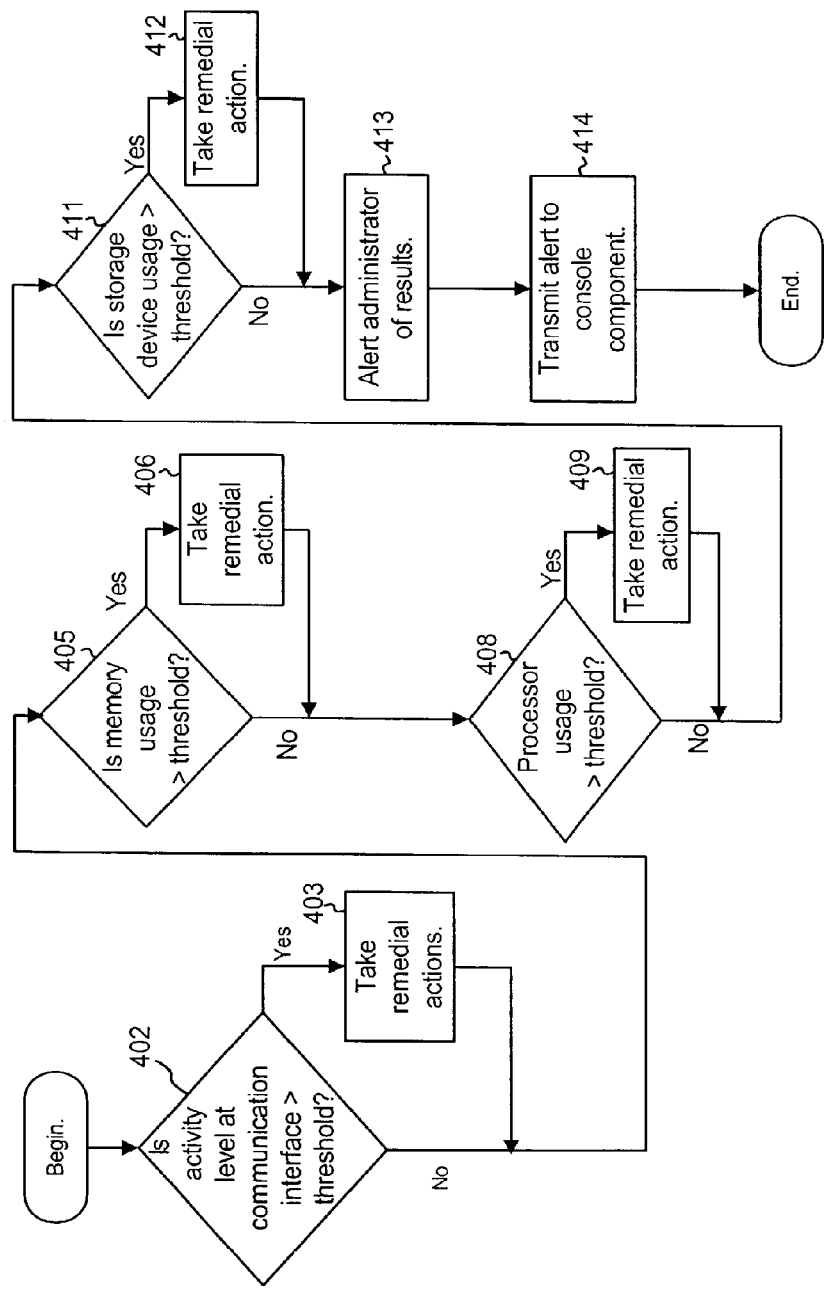
FIG. 4 is a flow chart illustrating operation of a host component consistent with an aspect of the invention.

FIG. 4 is a flow chart illustrating operation of host component 202 consistent with an aspect of the invention. Host component 202 may begin by checking an activity level of communication interface 280. This may include checking the number of open connections between server 103 and end-user computing devices 101. An end-user computing device 101 that wishes to receive information from server 103 begins by transmitting a request for a connection with server 103. Server 103, in turn, can accept or reject the connection. Additionally, server 103 may keep track of the number of open connections at any particular time.

Host component 202 maintains a threshold level relating to the activity level of communication interface 280. The threshold level may be set by a user either locally at server 103 or, as will be described in more detail below, from a remote computer running console component 203. The threshold level may be derived manually by the user, or automatically, based on historical activity levels. Host component 202 may check to determine whether the activity level of communication interface 280 is above the threshold (Act 402). If it is, host component 202 may take remedial actions to effectively throttle back the number of active connections (Act 403). Such actions can include closing open connections. For example, host component 202 may first close connections that are open but inactive. If the number of connections is still too high, host component 202 may close connections that the server 103 classifies as lower priority connections. If the number of connections is still too high, host component 202 may begin to randomly close open connections. In addition, while the number of open connections is above the threshold, host component 202 may refuse any new connection requests from end-user computing devices 101.

In addition to checking an activity level of communication interface 280, host component 202 may check usage of memory 230. When memory capacity exceeds a predetermined threshold level (e.g., b 95% of memory 230 is full), host component 202 may take memory-related remedial actions (Acts 405 and 406). These actions may include, for example, shutting down inactive processes (often referred to as zombie processes).

Host component 202 may also check processor usage. When the load on processor 220 is above a predetermined threshold (e.g., 90% of total processor capacity), host component 220 may take remedial actions (Acts 408 and 409). These actions may be similar to the actions taken in Act 406, and may include, for example, shutting down inactive processes or shutting down lower priority processes.

Host component 202 may also check the capacity of storage device 250, such as a hard disk drive(s). When storage device 250 has exceeded a predetermined threshold capacity (e.g., 95% of capacity), host component 220 may again take remedial action, (Acts 411 and 412), such as redirecting future disk write commands to console (i.e., to a monitor) or compressing non-critical files, such as log files.

Host component 202 may alert administrators of the actions taken in Acts 403, 406, 409, and 412 (Act 413). The alert may take the form of an e-mail, a pager notice, or a screen alert to an operator. Additionally, host component 202 may transmit an indication of the alert to a remote computer (Act 414). More particularly, consistent with an aspect of the invention, console component 203, residing at the remote computer, may receive the alert. Console component 203 may be configured to receive and monitor alerts from a number of host components 202 running on a number of different servers 103. This aspect of the invention is described in more detail below.

One of ordinary skill in the art will recognize that commands to check processor load, storage device load, and network connection load are well known, and are thus not described in detail herein.

Figure 5:
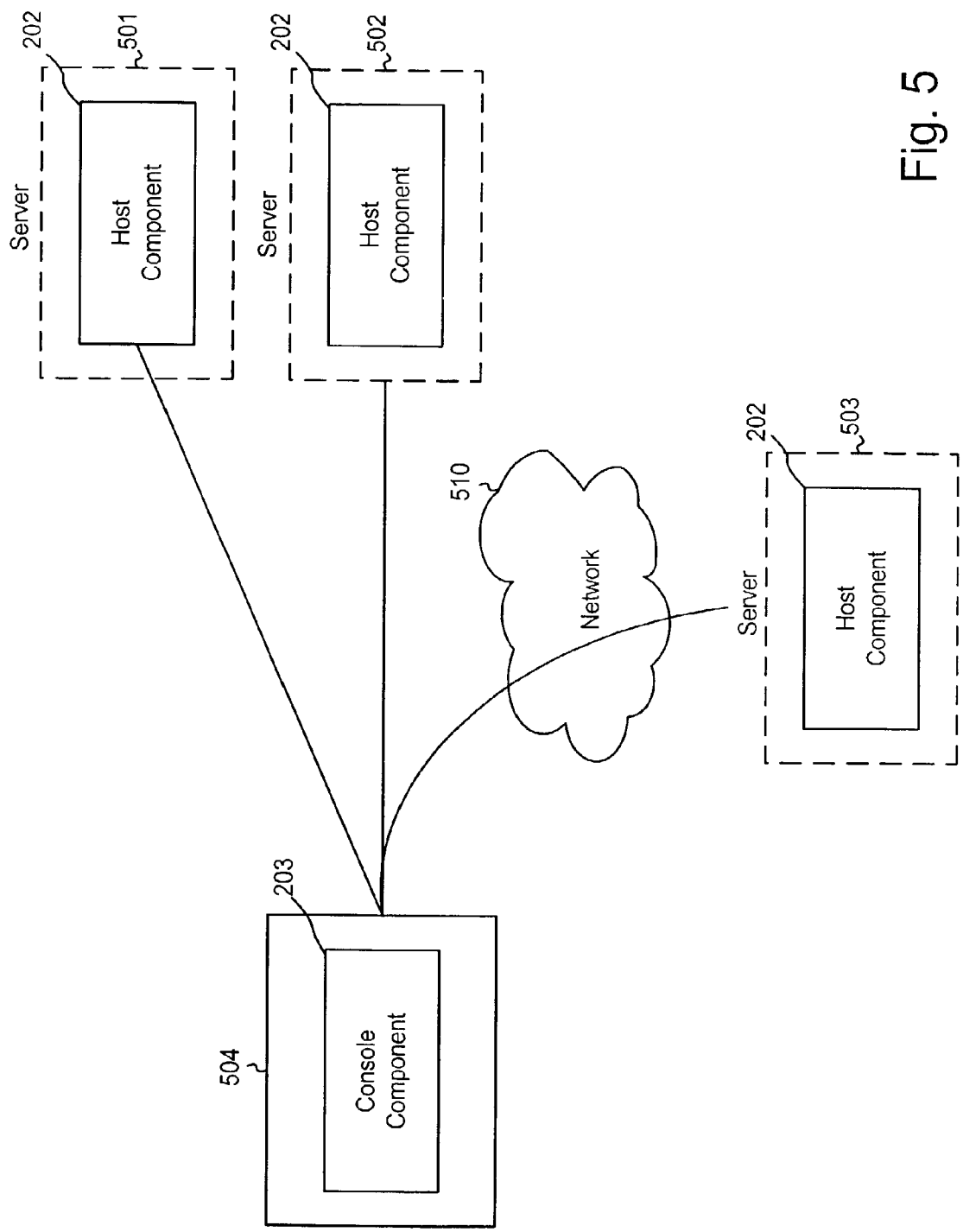
FIG. 5 is a diagram illustrating an implementation of a console component consistent with aspects of the invention.

FIG. 5 is a diagram illustrating an implementation of console component 203 consistent with aspects of the invention. Console component 203 may execute on a computing device 504, such as a server computer 103, and communicate with one or more host components 202. As shown in FIG. 5, console component 203 is connected to a number of host components 202, executing at servers 501-503.

Servers 501 and 502 may be a group of clustered servers that are connected locally or through a local area network to console component 203. Server 503 may be coupled remotely to console component 203 via wide area network 510.

Each of host components 202 may operate to transmit information relating to their generated alerts (see FIG. 4, Act 414). Operators local to console component 203 may view the alert information from multiple host components 202 and manage threshold settings for the host components 202.

Figure 6:
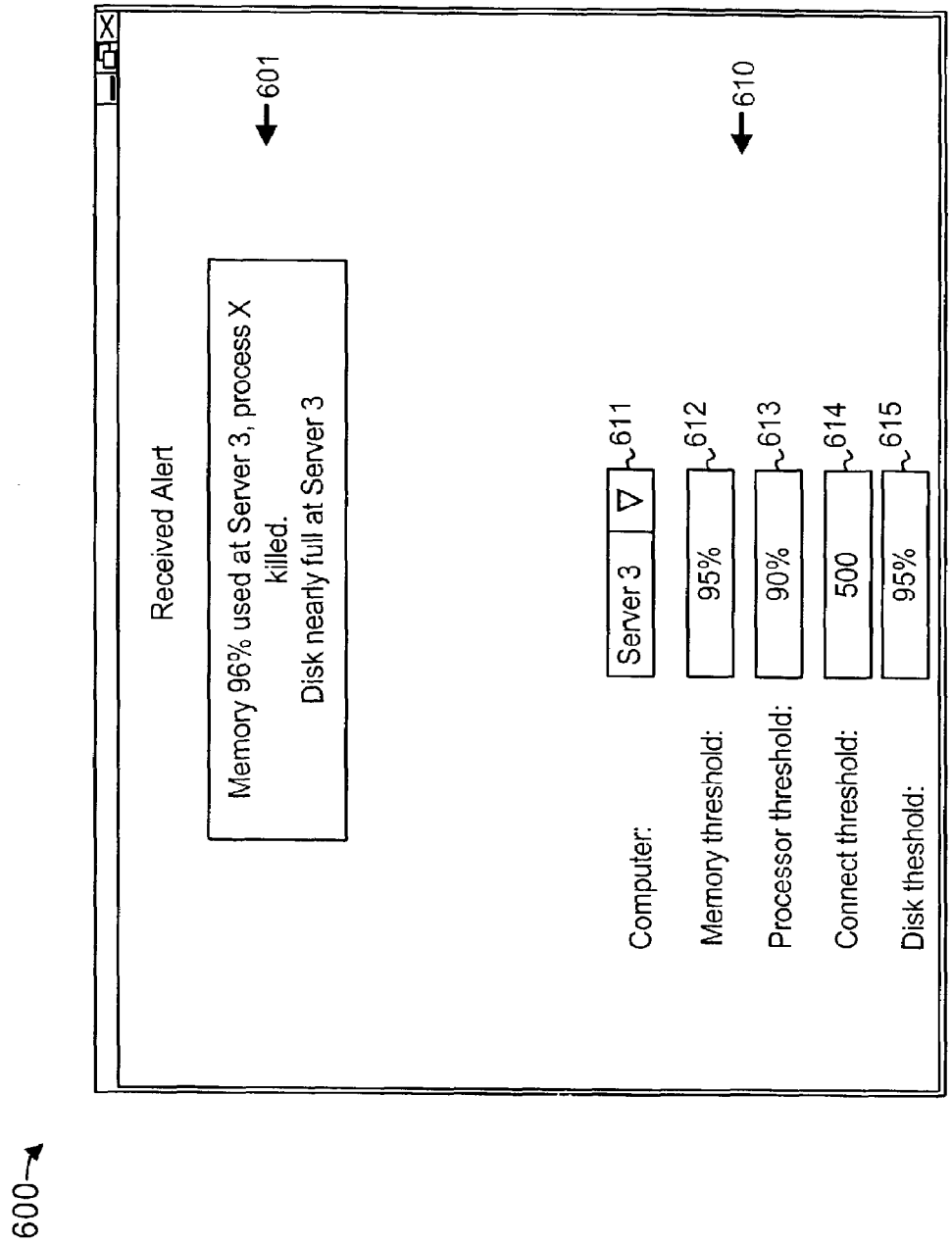
FIG. 6 is a diagram illustrating an exemplary graphical user interface (GUI) that may be displayed by the console component.

FIG. 6 is a diagram illustrating an exemplary graphical user interface (GUI) 600 that may be displayed by console component 203. GUI 600 may include an output section 601 and input section 610. Console component 203 may display alerts received from host components 202 to output section 601. In input section 610, operators may change configuration information, such as the threshold values, for a particular host component 202. Input section 610 may include a selection box 611 through which the user may select the host component 202 that the user is configuring. As shown in FIG. 6, the host component 202 at the server called "Server3" is being configured. Input section 610 may additionally include input boxes 612-615 for inputting threshold information relating to the memory usage threshold, the processor usage threshold, the connection threshold, and the disk usage threshold, respectively.

In addition to merely monitoring and logging resource alerts from host components 202, console component 203 may provide analysis and resource management functions. For example, console component 203 may correlate resource alerts from multiple host components 202. If a number of host components 202 generate similar resource alerts at approximately the same time, this may indicate that a concerted DoS attack is being performed against these computers. Console component 203 may then output information to a user indicating a possible DoS attack.

In some implementations, console component 203 may reallocate resources among servers based on alerts received from host components 202. For example, if host component 202 at server 501 issues a disk resource alert, console component 203 may instruct server 501 to begin using the disk resources of server 502.

Conclusion

The CHAINS components described above operate to ensure that servers do not crash because of issues relating to resource overload. By constantly monitoring resources of various servers and throttling back resource access when the resources of a server are over taxed, the CHAINS component helps to ensure that the server will continue to operate.

Sometimes the best method for preventing attacks such as DoS and DDoS attacks is to prevent the attack from occurring in the first place. By keeping servers tinder DoS and DDoS attacks from failing, an attacker may give up and move on to a more susceptible target.

The foregoing description of preferred embodiments of the invention provides illustration and description, but is not intended to be exhaustive or to limit the invention to the precise form disclosed. Modifications and variations are possible in light of the above teachings or may be acquired from practice of the invention. Moreover, while a series of acts have been presented with respect to FIG. 4, the order of the acts may be different in other implementations consistent with the present invention. Moreover, non-dependent acts may be performed in parallel.

Certain portions of the invention have been described as software that performs one or more functions. The software may more generally be implemented as any type of logic. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

The invention claimed is:

1. A method, performed by a first server, the method comprising:
    providing, by the first server, an interface having interactive elements, the interactive elements allowing indication of a threshold associated with an activity level of one of a number of resources associated with at least one of a plurality of network servers, the number of resources including at least one of a network connection, a processor, a random access memory, or a hard disk drive;
    receiving, by the first server, an indication to set a threshold associated with a particular resource of the number of resources and a particular network server of the plurality of network servers, the particular network server being a different server than the first server;
    transmitting, from the first server, a message to the particular network server, the message containing the threshold;
    receiving, by the first server, an alert from the particular network server, the alert indicating that the activity level of the resource of the number of resources associated with the particular network server has exceeded the threshold;
    providing, by the first server, the alert to a user; and
    providing, by the first server, instruction to the particular network server to use the particular resource associated with another network server of the plurality of network servers.

2. The method of claim 1, where providing the alert includes displaying the alert on a display device of the first server.

3. The method of claim 2, further comprising:
    displaying the threshold on the display device.

4. The method of claim 1, further comprising:
    logging the alert.

5. The method of claim 1, where the alert is a first alert, where the particular network server is a first network server of the plurality of network servers, where the threshold is a first threshold, the method further comprising:
   receiving a second alert from a second network server of the plurality of network servers,
   the second alert indicating that an activity level of the particular resource associated with the second network server has exceeded a second threshold;
   correlating the first alert and the second alert based on similarity of resource and timing of the first alert and second alert; and
   providing an indication of a denial of service attack based on the correlation.

6. The method of claim 1, where providing the alert to the user includes sending an e-mail to the user.

7. The method of claim 1, where providing the alert to the user includes sending a pager notice to the user.

8. The method of claim 1, where the particular network server monitors the activity level of the particular resource.

9. The method of claim 1, where the interface includes a plurality of interactive elements,
   where a first interactive element, of the plurality of interactive elements, allows adjustment of the threshold associated with the activity level of the particular resource associated with the particular network server, and
   where a second interactive element, of the plurality of interactive elements, allows adjustment of a different threshold associated with an activity level of a different resource associated with the particular network server.

10. The method of claim 9, where the first and second interactive elements are provided simultaneously on a display device.

11. The method of claim 9, where the interactive elements include at least one graphical menu.

12. A non-transitory computer readable medium storing instructions executable by a processor of a first server, the instructions comprising:
   a set of instructions that, when executed by the processor, cause the processor to provide an interface having interactive elements, the interactive elements allowing indication of a threshold associated with an activity level of one of a number of resources associated with at least one of a plurality of network servers, the number of resources including at least one of a network connection, a processor, a random access memory, or a hard disk drive;
   a set of instructions that, when executed by the processor, cause the processor to receive, an indication to set a threshold associated with a particular resource of the number of resources and a particular network server of the plurality of network servers, the particular network server being a different server than the first server;
   a set of instructions that, when executed by the processor, cause the processor to transmit a message to the particular network server, the message including the threshold, the particular network server monitoring an activity level of the particular resource;
   a set of instructions that, when executed by the processor, cause the processor to receive, an alert from the particular network server, the alert indicating that the activity level of the particular resource of the number of resources associated with the particular network server has exceeded the threshold;
   a set of instructions that, when executed by the processor, cause the processor to provide the alert to a user; and
   a set of instructions that, when executed by the processor, cause the processor to provide instruction to the particular network server to use the particular resource associated with another network server of the plurality of network servers.

13. The computer readable medium of claim 12, where the set of instructions that cause the processor to provide the alert to the user includes a set of instructions that cause the processor to send an e-mail to the user.

14. The computer readable medium of claim 12, where the set of instructions that cause the processor to provide the alert to the user includes a set of instructions that cause the processor to send a pager notice to the user.

15. A first server, comprising:
   one or more processors to:
      provide an interface having interactive elements, the interactive elements allowing indication of a threshold associated with an activity level of one of a number of resources associated with at least one of a plurality of network servers, the number of resources including at least one of a network connection, a processor, a random access memory, or a hard disk drive;
      receive an indication to set a threshold associated with a particular resource of the number of resources and a particular network server of the plurality of network servers, the particular network server being a different server than the first server;
      transmit a message to the particular network server, the message containing the threshold;
      receive an alert from the particular network server, the alert indicating that the activity level of the resource of the number of resources associated with the particular network server has exceeded the threshold;
      provide the alert to a user; and
      provide instruction to the particular network server to use the particular resource associated with another network server of the plurality of network servers.

* * * * *